US012507674B1

(12) United States Patent
Datto, III et al.

(10) Patent No.: US 12,507,674 B1
(45) Date of Patent: Dec. 30, 2025

(54) BEEHIVE WITH VIEWING AREA (71) Applicants: George A. Datto, III, Glen Mills, PA (US); Nathaniel W. Wolfe, II, Townsend, DE (US)

(72) Inventors: George A. Datto, III, Glen Mills, PA (US); Nathaniel W. Wolfe, II, Townsend, DE (US)

( * ) Notice: Subject to any disclaimer, the term of this patent is extended or adjusted under 35 U.S.C. 154(b) by 0 days.

(21) Appl. No.: 17/572,697

(22) Filed: Jan. 11, 2022

(51) Int. Cl.
A01K 47/06 (2006.01)
A01K 47/02 (2006.01)
A01K 49/00 (2006.01)

(52) U.S. Cl.
CPC .............. A01K 47/06 (2013.01); A01K 47/02 (2013.01); A01K 49/00 (2013.01)

(58) Field of Classification Search
CPC ......... A01K 47/00; A01K 47/06; A01K 47/02
See application file for complete search history.

(56) References Cited

U.S. PATENT DOCUMENTS

| | | | | |
|---|---|---|---|---|
| 32,769 A * | 7/1861 | Hartman | ................ | A01K 47/00 449/34 |
| 134,674 A * | 1/1873 | Barker | ................... | A01K 47/00 449/32 |
| 207,731 A * | 9/1878 | Gale | ...................... | A01K 47/06 449/13 |
| 327,268 A * | 9/1885 | Heddon | ................. | A01K 47/00 449/34 |
| 387,217 A * | 8/1888 | Doyal | .................... | A01K 47/02 449/35 |
| 1,382,068 A * | 6/1921 | Dewees | ................ | A01K 47/00 449/41 |
| 1,445,778 A * | 2/1923 | Little | ..................... | A01K 47/06 449/21 |
| 3,071,784 A * | 1/1963 | Kolb | ...................... | A01K 47/00 449/6 |
| 3,995,338 A * | 12/1976 | Kauffeld | ............... | A01K 47/06 449/19 |
| 4,337,541 A * | 7/1982 | Brown | .................. | A01K 47/06 449/19 |
| 4,736,479 A * | 4/1988 | Lagerman | ............. | A01K 47/06 449/20 |
| 6,450,858 B1* | 9/2002 | Schmitz | ................ | A01K 47/06 449/20 |
| 11,310,998 B2* | 4/2022 | Bajan | .................... | A01K 55/00 |
| 11,606,936 B2* | 3/2023 | Datto, III | .............. | A01K 47/06 |
| 2016/0227745 A1* | 8/2016 | Reed | ...................... | A01K 47/06 |
| 2020/0323178 A1* | 10/2020 | Datto, III | .............. | A01K 47/06 |
| 2022/0046902 A1* | 2/2022 | Freedman | ............. | A01K 47/02 |

FOREIGN PATENT DOCUMENTS

| | | | |
|---|---|---|---|
| JP | 2008529488 A | * | 8/2008 |
| KR | 200304677 Y1 | * | 2/2003 |
| KR | 102008434 B1 | * | 8/2019 |

* cited by examiner

Primary Examiner — Peter M Poon
Assistant Examiner — Shada Mohamed Alghailani
(74) Attorney, Agent, or Firm — Joseph E. Maenner; Petock & Petock LLC (57) ABSTRACT A beehive includes a lower compartment consisting of a first part and a remainder located on one side of the first part and a queen excluder extending over only the first part of the lower compartment. An upper compartment extends over the queen excluder and a removable lid extends over only the remainder of the lower compartment.

7 Claims, 8 Drawing Sheets

BEEHIVE WITH VIEWING AREA

BACKGROUND OF THE INVENTION

Field of the Invention

The present invention relates to beehive with a hinged lid portion that can be opened to allow viewing into the hive, as well as to allow for removal of brood frames without removing the honey supers.

Description of the Related Art

Man-made beehives are often used for commercial honey producers, as well as backyard enthusiasts. Prior art beehives, however, can be cumbersome to manipulate and do not allow for viewing bee activity inside the hive, without opening the hive and potentially subjecting viewers to bee stings.

It would be beneficial to provide a beehive that can allow convenient access to brood inspections and to harvest honey and also allow safe viewing into the hive.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a beehive that includes a lower compartment configured to retain a queen, a queen excluder extending over a first part of the lower compartment, an upper compartment extending over the queen excluder, and a removable lid extending over a remainder of the lower compartment.

In an alternative embodiment, the present invention provides a beehive comprising a lower compartment configured to retain a queen. The lower compartment is defined by a front face, a rear face opposite the front face, and opposing side faces extending between the front face and the rear face. A rib is removably attached to each of the opposing side faces and extends from proximate to the front face toward the rear face. A spacer extends from the rear face to the ribs and between the opposing side faces. A queen excluder extends between the opposing side faces from the rear face toward the front face. A viewing pane is located above the ribs adjacent to the queen excluder and extends between the opposing side faces. An upper compartment extends above the queen excluder. A lid is located above the viewing pane.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Referring to FIGS. 1-7, a beehive 100 according to an exemplary embodiment of the present invention is used to quickly and easily locate and to manage a brood nest without requiring a beekeeper to lift and remove honey supers from the top of the beehive 100. Additionally, moving frames from the queen compartments can be accomplished without disassembling the entire beehive 100, thereby saving time and reducing the potential for back strain and injury to beekeepers.

With the beehive 100, a beekeeper can maintain a hive that facilitates easy demaree manipulation to minimize effort. Working beehive 100 can take as little as five minutes instead of a typical 30 minutes to manage a prior art beehive.

The inventive beehive 100 can incorporate commercially available artificial beehive components, as, for example, standard (or "deep") size frames 170, a queen excluder 120, and a five-frame upper compartment, or "super" 140 that is seized to fit either the standard size frames 170 or smaller frames 192. The present invention is described with an upper compartment 140 that is sized to accommodate smaller frames 192.

Beehive 100 includes a generally parallelepiped lower compartment 102 configured to retain a queen. A queen excluder 120 extends over a first part 103 of the lower compartment 102. An upper compartment 140 extends over the queen excluder 120. A removable lid 160 extends over a remainder 117 of the lower compartment 102.

Lower compartment 102 is defined by a front face 104, a rear face 106 opposite the front face 104, opposing side faces 108, 110 extending between the front face 104 and the rear face 106, and an open top 114. Lower compartment 102 can include either an open bottom, if beehive 100 is to rest on a closed surface, such as a table or bench. Alternatively, lower compartment 102 can have a closed bottom, if beehive 100 is to rest on an open surface, such as sawhorses or an open frame. The presently disclosed hive 100 has an open bottom and can pbe placed on a commercially available bottom board (not shown).

Figure 7:
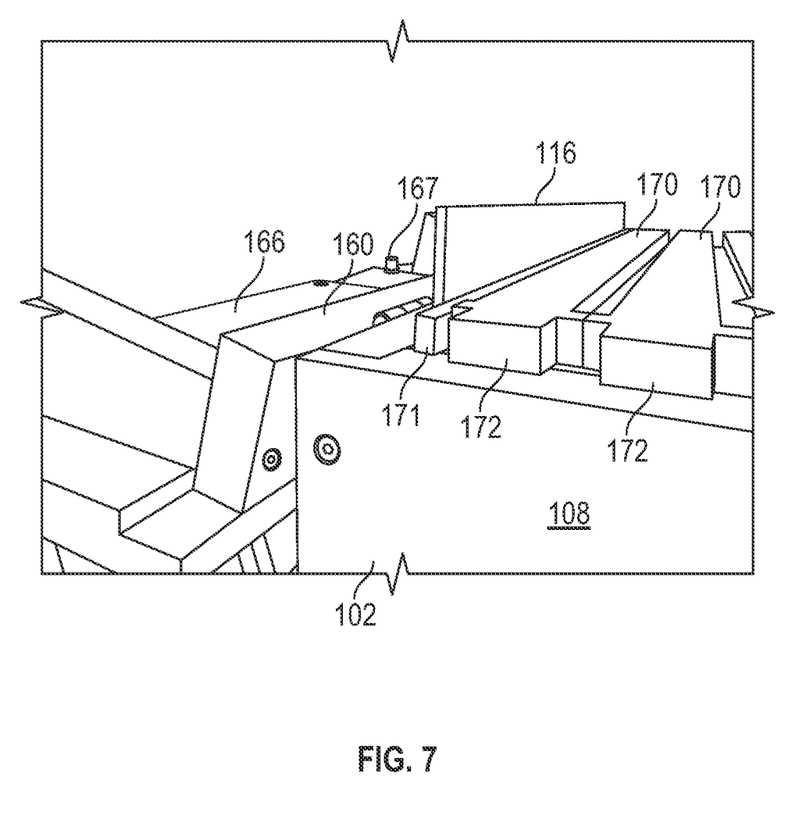
FIG. 7 is a perspective view of a corner of the beehive shown in FIG. 1, showing a backer board.

A backer board 116, shown in FIG. 7, is attached to a rear 104A of the front face 104. The backer board 116 is sized to extend above a top 104B of the front face 104 and to cover an interior portion of lid 160 when lid 160 is in a closed position. The backer board 116 is constructed from a low friction polymer material, such as Formica®, to discourage bees from propolizing on or around backer board 116 to prevent lid 160 from getting stuck in the closed position.

Lower compartment 102 is sized such that, when the frames 170 are installed lower compartment 102, a "bee space" exists between the sides and bottom of the frame 170 and lower compartment 102. The bee space is typically between about 5/16" and about 3/8" all around, which is small enough to allow the bees in the beehive 100 to maneuver around the frame 170, yet sufficiently large so as not to encourage the bees to propolize in the space, which would effectively glue the frame 170 to lower compartment 102. A follower board 171, shown in FIG. 7, can be inserted adjacent to a frame 170 to make up for any space between frames 170 and the rear of front face 104.

Figure 6:
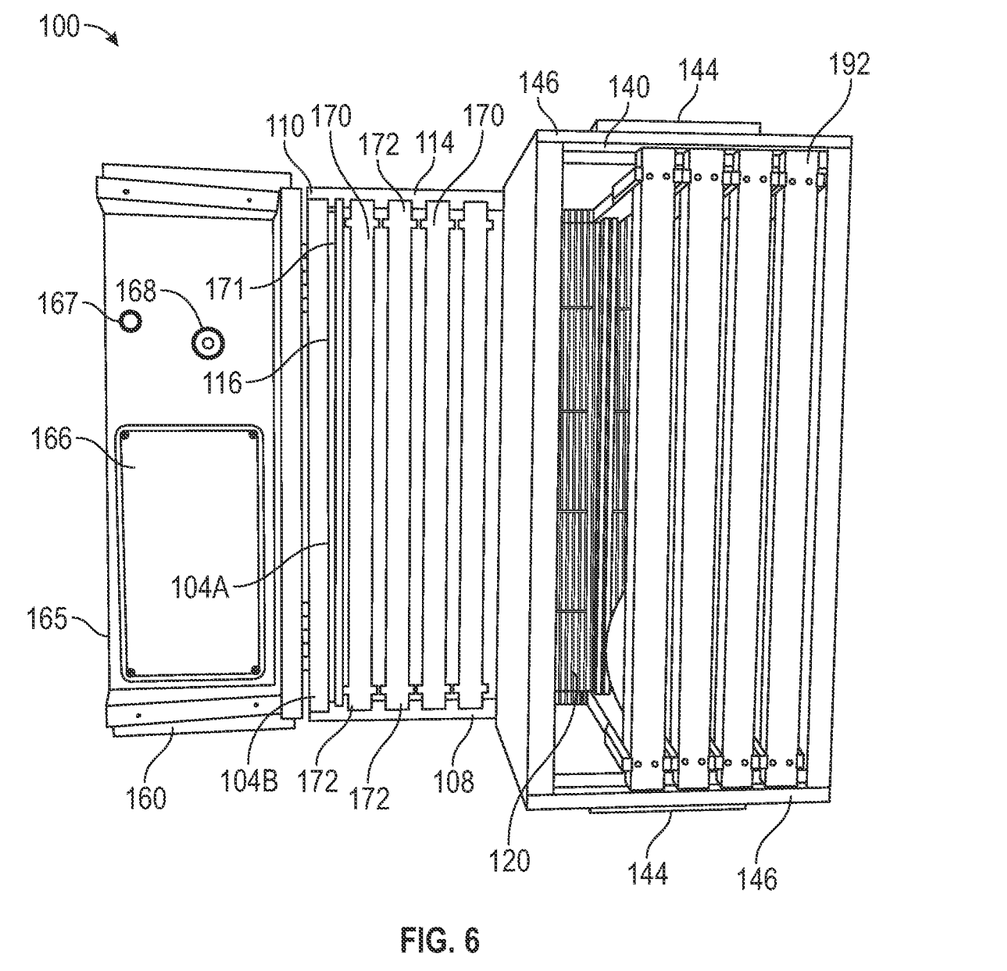
FIG. 6 is a top plan view of the beehive shown in FIG. 1, with the insulating layer, viewing pane, and ribs removed for access to brood frames.

Referring to FIG. 6, lower compartment 102 is sized to be able to removably receive a plurality of frames 170, which are commercially available honeycombed structures in which the queen lays her eggs. In an exemplary embodiment, lower compartment 102 is about 20 inches wide and about 9¼ inches high, although those skilled in the art will recognize that the lower compartment 102 can have other dimensions.

Referring to FIG. 6, each frame 170 includes an end tang 172 that extends over the side faces 108, 110 so that the side faces 108, 110 vertically support each frame 170. Each frame 170 is about 20 inches long and about 9 inches high, such that the bottom of the frame 170 is slightly elevated above the bottom of lower compartment 102. In an exemplary embodiment, eight frames 170 can fit into lower compartment 102.

Queen excluder 120 extends between the opposing side faces 108, 110 from the rear face 106 toward the front face 104 and extends over a first part 103 of lower compartment 102. The queen excluder 120 generally has the same footprint as the upper compartment 140. The queen excluder 120 includes a mesh with mesh openings that are large enough for worker bees to pass through, but too small for the queen to pass through, so that the queen remains in the lower compartment 102 and cannot migrate upward into upper compartment 140. The queen excluder 120 is removable from beehive 100 after upper compartment 140 is removed.

Figure 3:
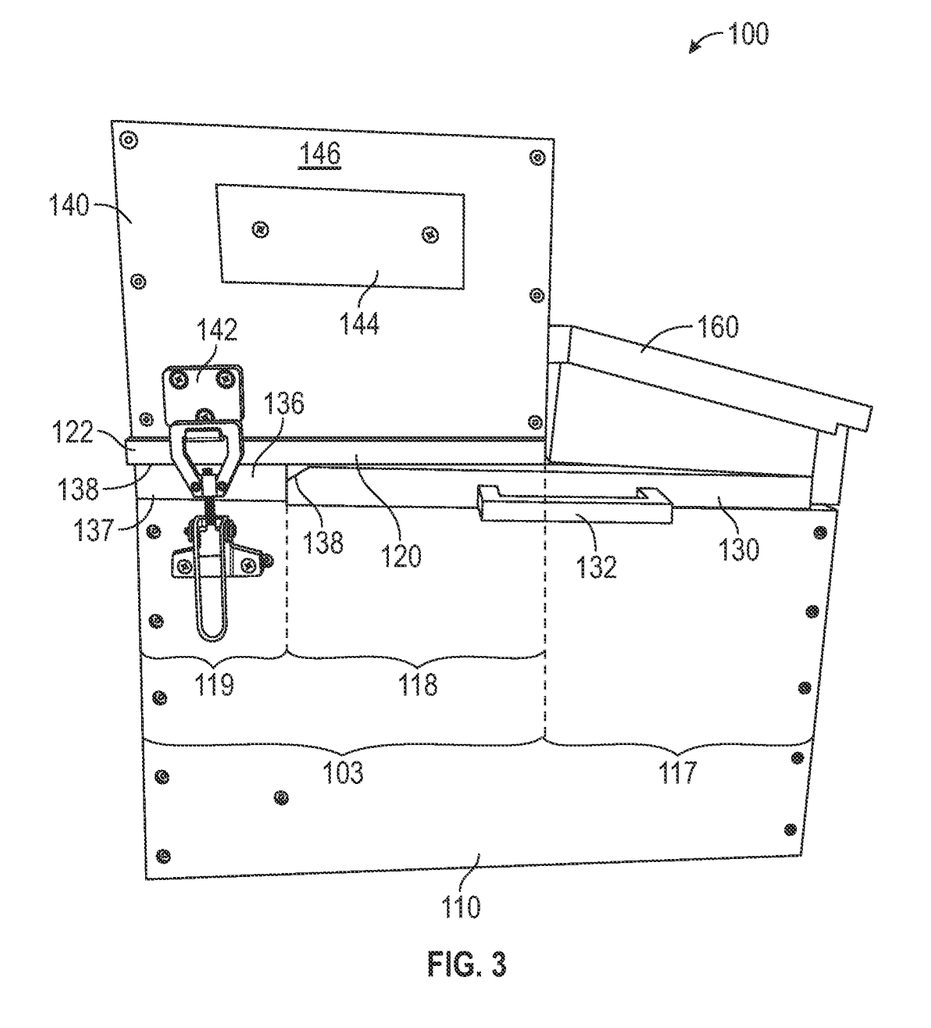
FIG. 3 is a side elevational view of the beehive shown in FIG. 1, with the opposing
Figure 3A:
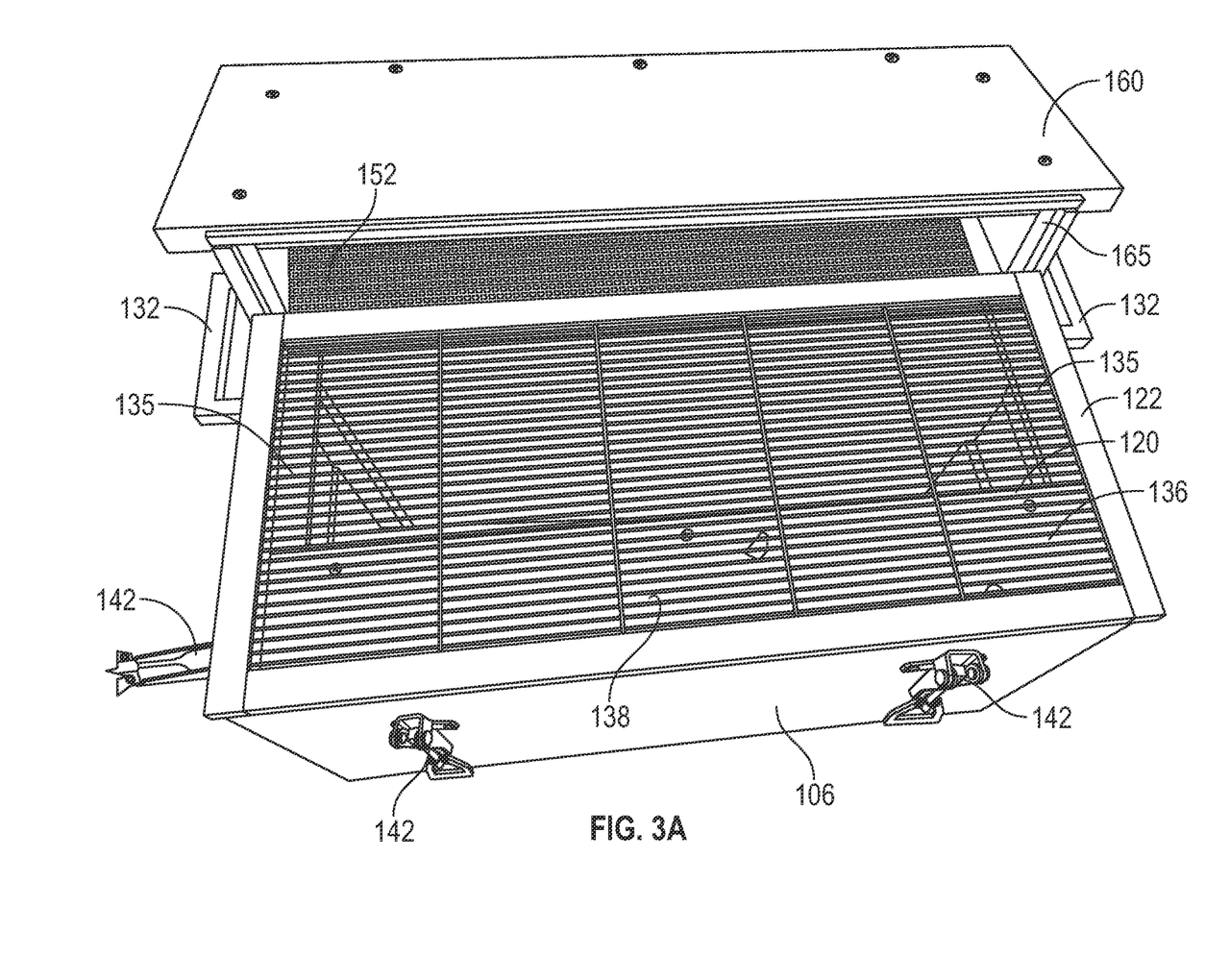
FIG. 3A is a perspective view of the beehive shown in FIG. 1, with an upper compartment removed.

Referring to FIG. 3A, queen excluder 120 further includes a frame 122 surrounding the perimeter of excluder 120. Frame 122 can be constructed of wood, aluminum, or other relatively light, non-rustable material. Frame 122 is used to keep queen excluder 120 level to prevent gaps between queen excluder 120 and upper compartment 140.

A rib 130 is removably attached to each of the opposing side faces 108, 110 and extends from proximate to the front face 104 toward the rear face 106. Each rib 130 extends along opposing sides 108, 110 of the lower compartment 102 and partially covers a remainder 117 of the lower compartment 102 and a portion 118 of the first part 103 of the lower compartment 102. Each of the ribs 130 includes a handle 132 such that the handle 132 can be grasped and the rib 130 can be slid laterally from the lower compartment 102.

Each rib 130 comprises a vertical leg 134 to which handle 132 is attached. Each vertical leg 134 is supported by a respective one of the side face 108, 110. A horizontal leg 135 extends in a plane perpendicular to the vertical leg 134. Horizontal leg 135 includes a chamfered top portion 138 proximate to queen excluder 120 to facilitate insertion and removal of rib 130 into beehive 100. Horizontal leg 132 rests on end tangs 172 of frames 170. In an exemplary embodiment, ribs 130 can be constructed from a low friction polymer to reduce propolizing that can "glue" ribs 130 to frames 170 and side faces 108, 110. Ribs 130 are laterally slidable and removable from lower compartment 102 so that frames 170 can be removed from and installed in lower compartment 102.

A spacer 136 is provided to support a portion of queen excluder 120 and extends from the rear face 106 to the ribs 130 and between the opposing side faces 108, 110 along a remaining portion 119 of the first part 103 of the lower compartment 102 such that spacer 136 and ribs 130 together extend generally the length of lower compartment 102. Spacer 136 is sized such that spacer 136 and a portion of each rib 130 extend under the queen excluder 120.

Spacer 136 has a lower face 137 attached to the lower compartment 102 and an upper face 139 extending non-parallel to the lower face 136 such that the non-parallel upper face 139 of the spacer 136 biases the queen excluder 120 away from the ribs 130 to allow the ribs to be laterally slid from lower compartment 102.

Upper compartment 140 extends above the queen excluder 120 and is configured to receive a super (not shown) stacked on top of the upper compartment. Upper compartment 140 is releasably securable to the lower compartment 102 via locking members 142 that are attached to rear face 106 and opposing side faces 108, 110 proximate to rear face 106. Locking members 142 cantilever the queen excluder 120 above the ribs 130 such that the queen excluder 120 extends at least partially above the ribs 130 to facilitate removal of the ribs 130 from lower compartment 102 to provide access to the frames 170.

Handles 144 are provided along sides 146 of upper compartment to facilitate lifting of beehive 100.

Figure 4:
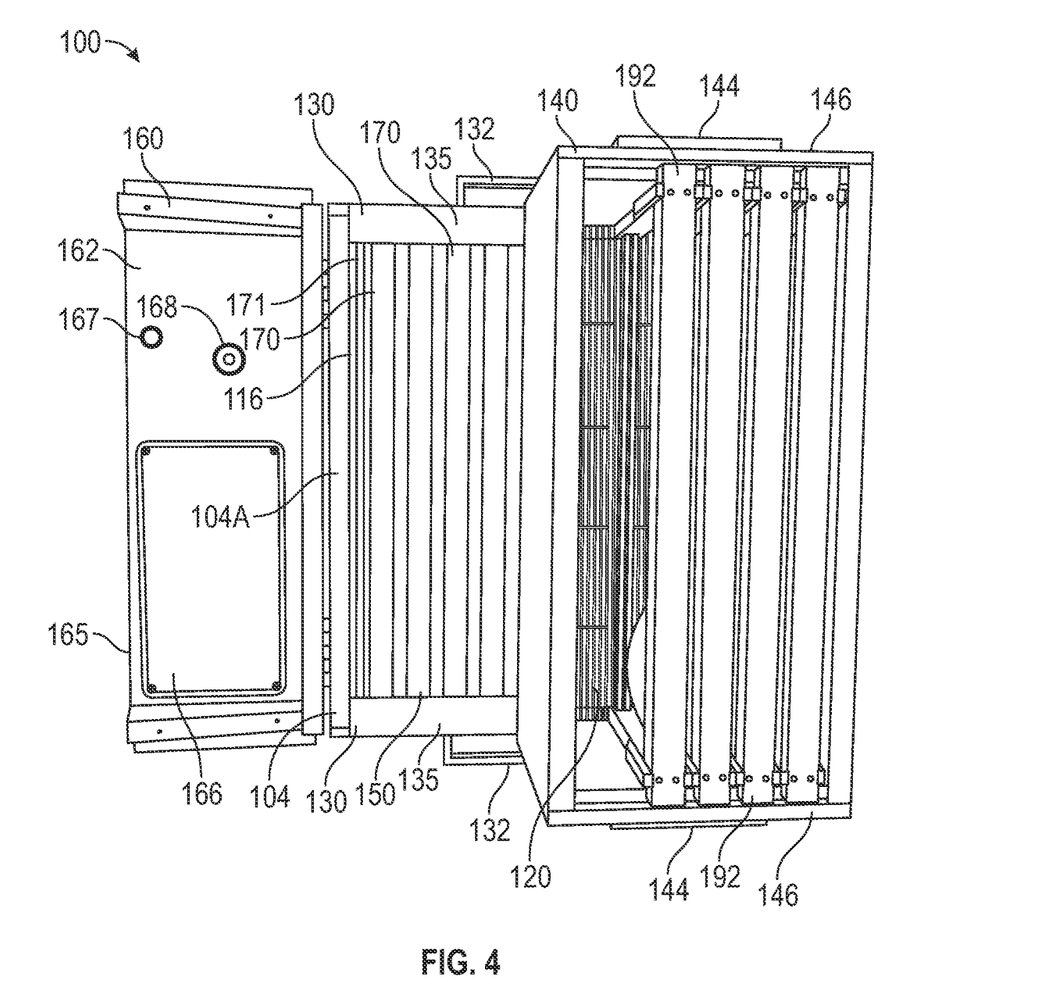
FIG. 4 is a top plan view of the beehive shown in FIG. 1, with the lid open.

A viewing pane 150, shown in FIG. 4, is located above the ribs 130 adjacent to the queen excluder 120 and extends between the opposing side faces 108, 110 over the remainder 117 of lower compartment 102. Viewing pane 150 can be a transparent covering, such as plexiglass and extends between the remainder 117 of the lower compartment 102 and the lid 160. Viewing pane 150 allows a person to remove lid 160 to view bee activity inside lower compartment 102. Ribs 130 and the viewing pane 160 are removable to allow access into the lower compartment 102 to remove or insert frames 170.

Figure 5:
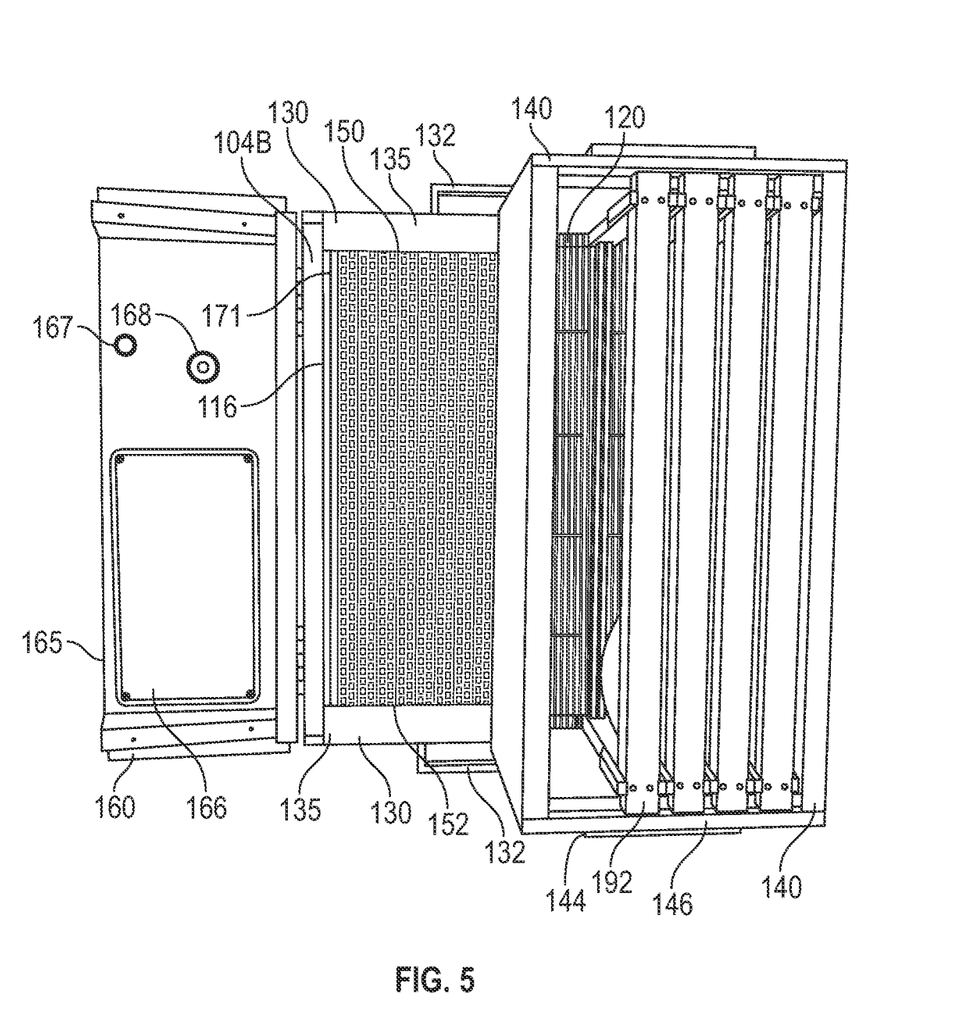
FIG. 5 is a top plan view of the beehive shown in FIG. 1, with an insulating sheet applied.

Optionally, a thermal insulation sheet 152, shown in FIG. 5, can be removably placed over viewing pane 150 to thermally insulate beehive 100 around pane 150 to reduce the possibility of freezing the bees in beehive 100.

Figure 1:
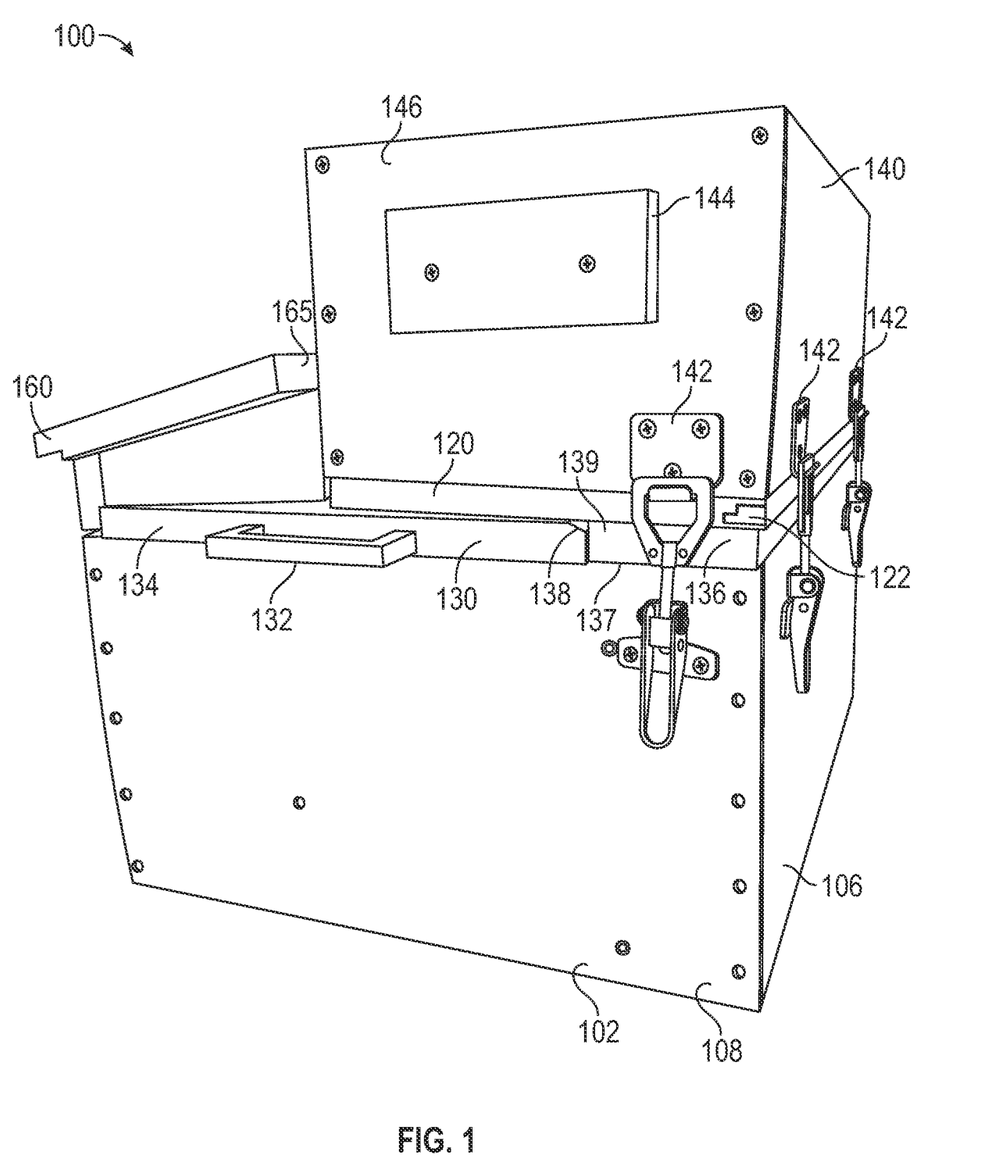
FIG. 1 is a perspective view of a beehive according to an exemplary embodiment of the present invention.
Figure 2:
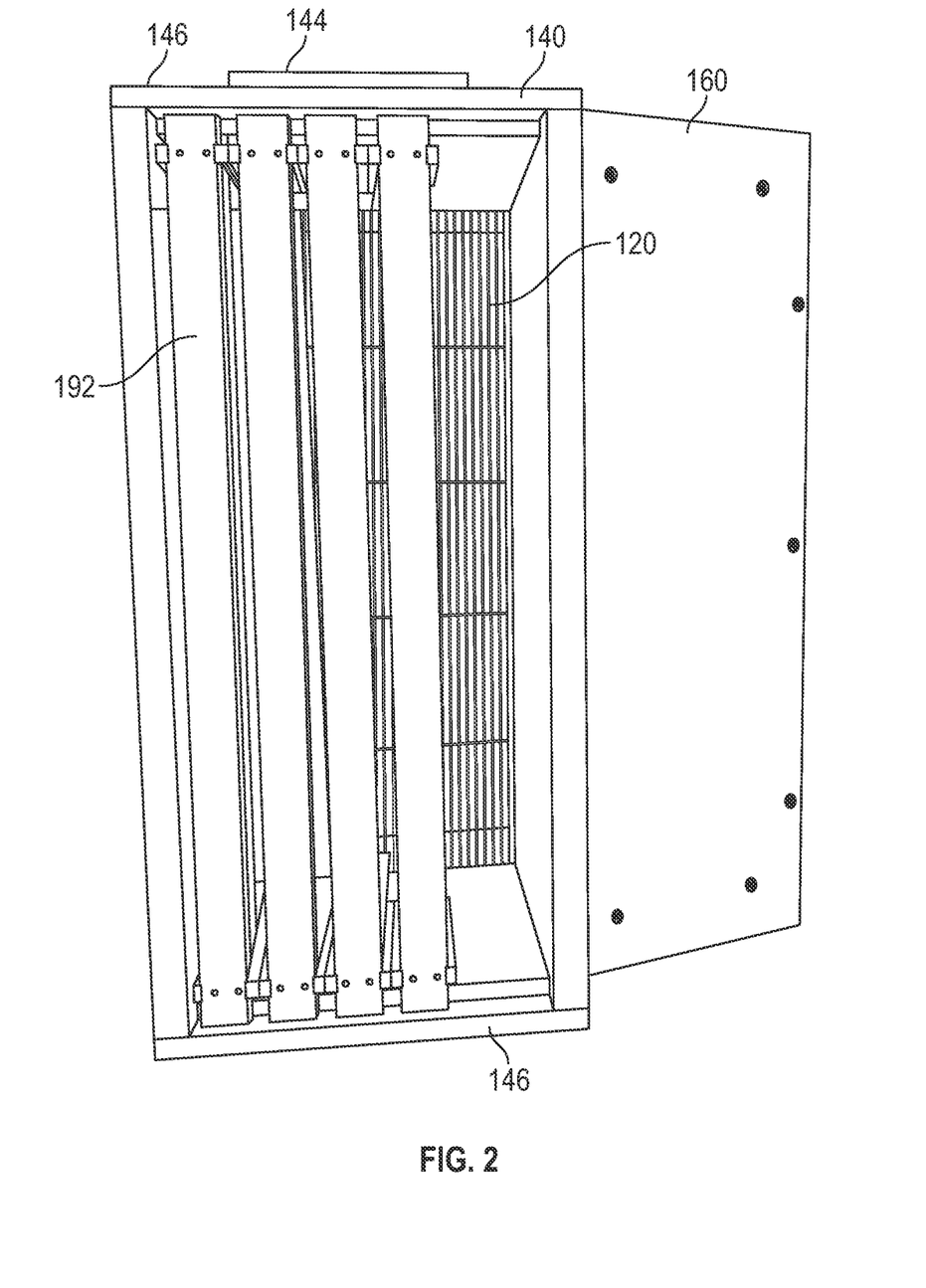
FIG. 2 is a is a top plan view of the beehive shown in FIG. 1, with the lid closed.

Lid 160 extends over pane 150 and is hingedly connected to the lower compartment 102, specifically, to front face 104 of lower compartment 102, so that lid 160 can be pivoted from a closed position, shown in FIGS. 1-3, to an open position, shown in FIGS. 4-6, and an interior 162 of lid 160 can be used as a work table.

Lid 160 is sloped away from upper compartment 140 to direct rain water away from beehive 100 when lid 160 is in a closed position. When lid 160 is closed, an inner face 164 of lid 160 faces upper compartment 140. A flexible gasket material 165 is attached to inner face 164 and acts as a seal between lid 160 and upper compartment 140 when lid 160 is in the closed position.

A dry erase board 166 and a pen holder 167 can be attached to the interior 162 of lid 160 to allow the beekeeper to write notes about the hive. Additionally, a magnet 168 can be attached to the interior 162 of the lid 160 to retain metallic tools, such as a hive tool (not shown) for scraping propolis away from the sides of beehive 100.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A beehive comprising:
    a lower compartment configured to retain a queen, the lower compartment defined by a front face, a rear face opposite the front face, opposing side faces extending between the front face and the rear face, and an open top;
    a rib removably attached to each of the opposing side faces and extending from proximate to the front face toward the rear face;
    a spacer extending from the rear face to the ribs and between the opposing side faces;
    a queen excluder extending between the opposing side faces from the rear face toward the front face;
    a viewing pane comprising a transparent covering, the covering being located above the ribs adjacent to the queen excluder and extending between the opposing side faces, the viewing pane allowing a viewer to look down into the lower compartment;
    an upper compartment extending above the queen excluder; and
    a lid located above the viewing pane, the lid being movable to view into the lower compartment through the viewing pane.

2. The beehive according to claim 1, wherein at least one of the ribs includes a handle such that the handle can be grasped and the at least one of the ribs can be slid laterally from the lower compartment.

3. The beehive according to claim 1, wherein the upper compartment is releasably secured to the lower compartment by locking members.

4. The beehive according to claim 3, wherein the locking members cantilever the queen excluder above the ribs such that the queen excluder extends at least partially above the ribs.

5. The beehive according to claim 1, wherein the lid is hingedly attached to the front face.

6. The beehive according to claim 5, further comprising a backer board attached to a rear of the front face, the backer board extending above a top of the front face.

7. The beehive according to claim 1, wherein at least one of the ribs and the viewing pane are removable to allow access into the lower compartment.

* * * * *